Patented Nov. 28, 1933

1,936,926

UNITED STATES PATENT OFFICE 1,936,926

HYDROXYCARBOXYLIC ACID ARYLIDES

Karl Zahn, Kurt Schimmelschmidt, and Heinrich Koch, Frankfort-on-the-Main-Hochst, Germany, assignors to General Aniline Works, Inc., New York, N. Y., a corporation of Delaware No Drawing. Application February 3, 1932, Serial No. 590,782, and in Germany February 7, 1931

5 Claims. (Cl. 260—124)

The present invention relates to hydroxy-carboxylic acid arylides.

We have found that arylides which, in the form of their alkaline salts, possess a high affinity for vegetable fiber, are obtainable by condensing 2.3-hydroxynaphthoic acid or a substitution product with 4-aminodiphenyl or a substitution product thereof. The term "substitution products of 4-amino-diphenyl" as used herein is intended to include compounds containing a bridge in the 2.2'-position of the diphenyl nucleus, as, for instance, 2-aminofluorene, 2-aminofluorenone, 2-amino carbazole, 2-amino-diphenylene-oxide or their substitution products; the term "substitution product of a 2'.3'-hydroxynaphthoyl-4-aminodiphenyl" is to be similarly understood. The condensation may be conducted according to known general methods for making arylides of 2.3-hydroxynaphthoic acid.

A high substantivity is very much desired when dyeing with the aid of mechanical apparatus. In general, it may be said that by introducing a substituted or unsubstituted phenyl-group in para-position to the amino-group of the arylide compound the substantivity is increased. Whereas, for instance, 2'.3'-hydroxynaphthoyl-1-aminobenzene is absorbed by the fiber to the extent of 10 per cent, the arylide obtainable by introducing a phenyl-group in 4-position of the aniline radical, namely the 2'.3'-hydroxynaphthoyl-4-amino-diphenyl of the Formula I, is absorbed under same conditions to the extent of 55-60 per cent. The 2'.3'-hydroxynapthoyl-1-amino-2-methoxybenzene, for instance, has a substantivity of 12 per cent., whereas the 2'.3'-hydroxynaphthoyl-4-amino-3-methoxydiphenyl has a substantivity of 60 per cent. The 2'.3'-hydroxynaphthoyl-1-amino-2.5-dimethoxybenzene is absorbed to the extent of 17 to 18 per cent., whereas the 2'.3'-hydroxynapthoyl-4-amino-2.5-dimethoxydiphenyl is absorbed to the extent of 40 per cent. Furthermore, there are, for instance, absorbed 2''.3''-hydroxynaphthoyl-4-amino-4'-ethoxydiphenyl of the Formula II to the extent of 70 per cent.

2'.3'-hydroxynaphthoyl-2-aminofluorene of the Formula III to the extent of about 70 per cent.

2'.3'-hydroxynaphthoyl-2-aminofluorenone of the Formula IV to the extent of about 60 per cent.

2'.3'-hydroxynaphthoyl-2-aminocarbazole of the Formula V to the extent of 80 to 90 per cent. and 2'.3'-hydroxynaphthoyl-2-amino-diphenylene-oxide of the Formula VI to the extent of 60 per cent.

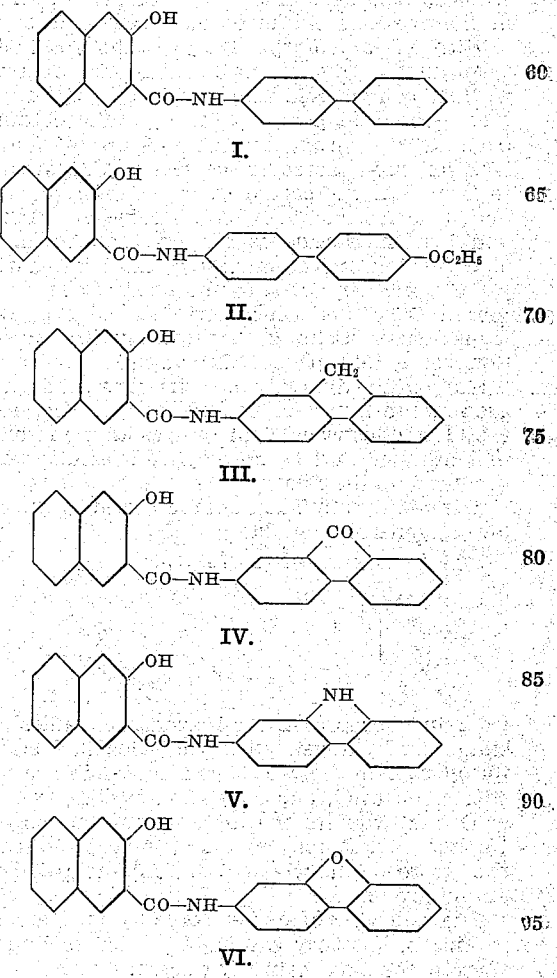

Most of the new arylides have a much better affinity for the fiber than the naphthol known to be the most substantive, namely the 2'.3'-hydroxynaphthoyl-2-aminonaphthalene which is absorbed by the fiber under same conditions to the extent of 40 per cent.

The new arylides are characterized by the following general formula:

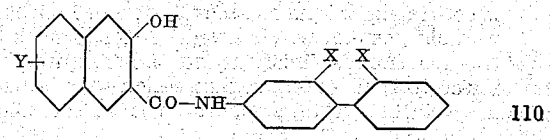

wherein Y stands for hydrogen, alkoxy or halogen, X stands for hydrogen or the two X's jointly stand for a substituent of the group consisting of $CH_2$, CO, NH or O, and wherein the diphenyl nucleus may be further substituted by alkyl, alkoxy, halogen, the nitro-, phenyl- or sulfonic acid-dialkyl-amino-group.

Furthermore, we have found that azo-dyestuffs of good properties are obtainable by coupling an arylide of the kind mentioned above with any diazo compound, either in substance, on the fiber or in the presence of any of the usual substrata which are adapted for the production of lakes. When producing the dyestuffs on the fiber, it is advantageous to use components which do not contain groups rendering the dyestuffs soluble in water as, for instance, a sulfonic acid or carboxylic acid group.

Since derivatives of 4-aminodiphenyl, 2-aminofluorene, 2-aminofluorenone, etc., hitherto, have not been used for the preparation of dyestuffs of the said kind, the fastness properties of the dyestuffs obtained could not be foreseen.

With the aid of the azo-dyestuffs obtainable according to this invention there are obtained without complicated after-treatment, dyeings of great tinctorial power. The dyestuffs obtained from 2'.3'-hydroxynaphthoyl-4-amino-2.5-dialkoxydiphenyl, moreover, possess a good fastness to light. In the case of these coupling components the fastness to light lies between grades 6 and 7 of the standards for "Fastness to Light" of the "Echtheitskommission der Fachgruppe für Chemie der Farben- und Textilindustrie im Verein Deutscher Chemiker", 4th edition, 1928 (reprinted in "Schultz, Farbstofftabellen, 7th edition, vol. 1, 1931, page XXXI et seq.).

Many of the dyestuffs have brilliant tints which are very much in demand and they are, therefore, useful in industry as pigment dyes when produced in substance and as developing dyestuffs when produced on the fiber.

The new dyestuffs are characterized by the following general formula:

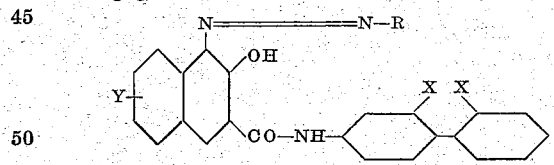

wherein R represents an aromatic radical, Y stands for hydrogen, alkoxy or halogen, X stands for hydrogn or the two X's jointly stand for a substituent of the group consisting of $CH_2$, CO, NH or O, and wherein the diphenyl nucleus may be further substituted by alkyl, alkoxy, halogen, the nitro-, phenyl- or sulfonic-acid-dialkyl-amino-group.

The following examples serve to illustrate the invention, but they are not intended to limit it thereto, the parts being by weight:

(1) 188 parts of 2.3-hydroxynaphthoic acid and 169 parts of 4-aminodiphenyl are introduced into 2000 parts of toluene; to this suspension 70 parts of phosphorus trichloride are gradually added, drop by drop, at 70° C., while stirring. When the whole quantity of phosphorus trichloride has been added, the mixture is heated to boiling while continuously stirring, and boiling is continued as long as an evolution of hydrochloric acid gas can be observed. After some hours, the reaction is finished and the mixture is allowed to cool. The product which is obtained in a crystalline form is separated from the toluene by filtering by suction and purified by boiling it with dilute sodium carbonate solution, in which the arylide is insoluble. After drying, 270 parts of a colorless product are obtained, corresponding with a yield of 80 per cent. By recrystallization from benzyl alcohol the 2'.3'-hydroxynaphthoyl-4-aminodiphenyl of melting point 283° C. is obtained in an entirely pure state. It dissolves in alcoholic alkali to a yellow solution which on dilution with water is de-colorized with separation of the free arylide.

By using instead of the 4-amino-diphenyl the 4-amino-4'-ethoxydiphenyl, the 2''.3''-hydroxynaphthoyl-4-amino-4'-ethoxydiphenyl is obtained, melting at 275° C. and likewise dissolving in alcoholic alkali to a yellow solution from which, however, the arylide does not separate on dilution with water.

In the same manner, there are obtained, the

2''.3''-hydroxynaphthoyl-4-amino-4'-nitrodiphenyl, melting at 324° C. to 325° C., 2''.3''-hydroxynaphthoyl-4-amino-4'-chlorodiphenyl, melting at 304° C. to 306° C., 6'-bromo-2'.3'-hydroxynaphthoyl-4-aminodiphenyl, melting at 322° C. to 323° C., 7'-methoxy-2'.3'-hydroxynaphthoyl-4-aminodiphenyl, melting at 302° C. to 303° C., 2'.3'-hydroxynaphthoyl-4-amino-3-methoxydiphenyl, melting at 214° C. to 216° C., 2'.3'-hydroxynaphthoyl-4-amino-2.5-dimethoxydiphenyl, melting at 219° C. to 220° C., 6'-bromo-2'.3'-hydroxynaphthoyl-4-amino-2.5-dimethoxydiphenyl, melting at 233° C. to 234° C., 2''.3''-hydroxynaphthoyl-4-amino-2.5.4'-trimethoxydiphenyl, melting at 221° C. to 224° C., 2''.3''-hydroxynaphthoyl-4-amino-2.5-dimethoxy-4'-phenyl-diphenyl, melting at 221° C. to 222° C., 2''.3''-hydroxynaphthoyl-4-amino-2'-methoxy-diphenyl, melting at 214° C., 2''.3''-hydroxynaphthoyl-4-amino-4'-methoxy-diphenyl, melting at 295° C. to 296° C., 2''.3''-hydroxynaphthoyl-4-amino-2'-nitro-diphenyl, melting at 264° C. to 266° C., 2''.3''-hydroxynaphthoyl-4-amino-diphenyl-4'-sulfonic acid-dimethylamide, melting at 263° C. to 264° C., 2''.3''-hydroxynaphthoyl-4-amino-diphenyl-4'-sulfonic acid-diethylamide, melting at 263° C. to 264° C., 2'.3'-hydroxynaphthoyl-4-amino-3-chlordiphenyl, melting at 257° C. to 258° C., 2'.3'-hydroxynaphthoyl-4-amino-3-methyldiphenyl, melting at 239° C., (2) 188 parts of 2.3-hydroxynaphthoic acid and 181 parts of 2-aminofluorene are introduced while stirring into 2500 parts of chlorobenzene and 70 parts of phosphorus trichloride are gradually added drop by drop at a temperature of 70° C. to 80° C. Thereupon, the mixture is heated to boiling while continuously stirring, and heating is continued until the evolution of hydrochloric acid gas has ceased. After some hours, the reaction is complete and the mixture is allowed to cool. The crystalline product is separated from the chlorobenzene by filtering by suction and purified by boiling it with dilute sodium carbonate solution, in which the arylide is insoluble. After drying, there are obtained 290 parts of a yellowish product which melts at 279° C. to 280° C., whilst becoming darker in color. The 2'.3'-hydroxynaphthoxyl-2-aminofluorene dissolves in alcoholic alkali to a yellow solution with an intense green fluorescence, from which on dilution with water the arylide again separates owing to hydrolysis.

(3) 50 parts of 2-acetoxy-3-napthoyl chloride are heated to boiling with 40 parts of 2-aminofluorenone, 500 parts of benzene and 20 parts of pyridine for one hour in a reflux apparatus. A yellow crystalline condensation product precipitates which, after cooling, is filtered by suction and freed from adherent benzene, pyridine compounds and any excess of carboxylic acid which may be present, by steam distillation in the presence of sodium carbonate solution. The acetyl compound thus obtained is then stirred with 800 parts of alcohol and 50 parts of caustic soda solution of 40 per cent. strength whereby the whole dissolves to a red solution. The solution is filtered, run into dilute hydrochloric acid and the precipitate formed thereby is filtered by suction and dried. There is obtained the 2'.3'-hydroxynaphthoyl-2-aminofluorenone of melting point 295° C. to 298° C.

(4) A suspension in 3500 parts of anhydrous xylene, of 217 parts of 2-aminocarbazole and 235 parts of 2.3-hydroxynaphthoic acid of 96 per cent. strength is heated to boiling; a solution of 75 parts of phosphorus trichloride in 100 parts of xylene is then added drop by drop within one hour while stirring, and the whole is heated in a reflux apparatus until the evolution of hydrochloric acid is complete. The whole is allowed to cool to about 90° C., the 2'.3'-hydroxynaphthoyl-2-aminocarbazole which has separated is filtered by suction and washed with xylene having a temperature of 90° C.; the adherent xylene is removed by treatment with steam and any unchanged 2.3-hydroxynaphthoic acid which may be present, is eliminated by extraction with sodium carbonate solution. The product is again filtered by suction and dried. 380 parts of 2'.3'-hydroxynaphthoyl-2-aminocarbazole are obtained.

In an analogous manner, there is obtained from 2.3-hydroxynaphtholic acid and 2-aminodiphenylene-oxide the 2'.3'-hydroxynaphthoyl-2-aminodiphenylene-oxide of melting point 300° C., which dissolves in alcoholic alkali to a yellow solution. By pouring this solution into water, the arylide hydrolizes and precipitates completely.

We claim:

1. The compounds of the following general formula:

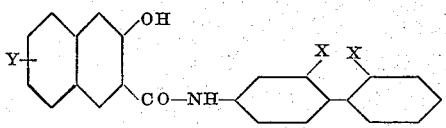

wherein Y stands for hydrogen, alkoxy or halogen, X stands for hydrogen or the two X's jointly stand for a substituent of the group consisting of $CH_2$, CO, NH or O, and wherein the diphenyl nucleus may be further substituted by alkyl, alkoxy, halogen, the nitro-, phenyl- or sulfonic acid - dialkyl-amino-group, being crystallized compounds soluble in high-boiling organic solvents and in alcoholic alkali and possessing a high affinity for the vegetable fiber.

2. The compounds of the following general formula:

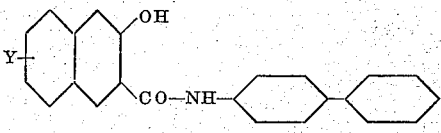

wherein Y stands for hydrogen, alkoxy or halogen, and the diphenyl nucleus may be substituted by alkyl, alkoxy, halogen, the nitro-, phenyl- or sulfonic acid-dialkyl-amino-group, being crystallized compounds soluble in high-boiling organic solvents and with a yellow color in alcoholic alkali and possessing a high affinity for the vegetable fiber.

3. The compound of the following formula:

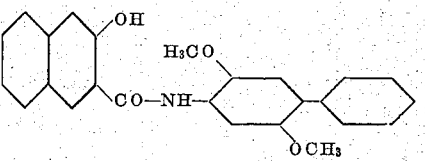

being a crystallized compound, melting at 219° C. to 220° C., soluble in high-boiling organic solvents and with a yellow color in alcoholic alkali and possessing a high affinity for the vegetable fiber.

4. The compound of the following formula:

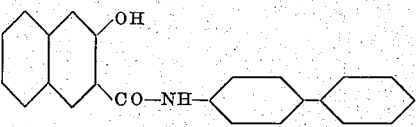

being a crystallized compound, melting at 283° C., soluble in high-boiling organic solvents and with a yellow color in alcoholic alkali and possessing a high affinity for the vegetable fiber.

5. The compounds of the following general formula:

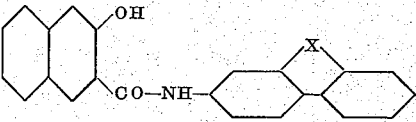

wherein X stands for a substituent of the group consisting of $CH_2$, CO, NH or O, being crystallized compounds soluble in high-boiling organic solvents and in alcoholic alkali and possessing a high affinity for the vegetable fiber.

KARL ZAHN.
KURT SCHIMMELSCHMIDT.
HEINRICH KOCH.

DISCLAIMER 1,936,926.—*Karl Zahn, Kurt Schimmelschmidt,* and *Heinrich Koch,* of Frankfort-on-the-Main-Hochst, Germany. HYDROXYCARBOXYLIC ACID ARYLIDES. Patent dated November 28, 1933. Disclaimer filed April 16, 1936, by the assignee, *General Aniline Works, Inc.*

Hereby enters this disclaimer to claims 1, 2, 3, and 4.

[*Official Gazette May 12, 1936.*]